United States Patent
Mahalal (10) Patent No.: US 7,147,167 B2
(45) Date of Patent: Dec. 12, 2006

(54) UPDATE MANAGEMENT FOR ENCODED DATA IN MEMORY

(75) Inventor: Ilan Mahalal, Paris (FR)

(73) Assignee: Axalto SA, Menudon (FR)

( * ) Notice: Subject to any disclaimer, the term of this patent is extended or adjusted under 35 U.S.C. 154(b) by 0 days.

(21) Appl. No.: 10/502,823

(22) PCT Filed: Jan. 31, 2003

(86) PCT No.: PCT/IB03/00311

§ 371 (c)(1),
(2), (4) Date: Jul. 27, 2004

(87) PCT Pub. No.: WO03/065319

PCT Pub. Date: Aug. 7, 2003

(65) Prior Publication Data

US 2005/0127188 A1    Jun. 16, 2005

(30) Foreign Application Priority Data

Feb. 1, 2002    (FR) .................................. 02 01363

(51) Int. Cl.
*G06K 19/06*    (2006.01)

(52) U.S. Cl. ...................................................... 235/492
(58) Field of Classification Search ................. 235/492; 365/189.01

See application file for complete search history.

(56) References Cited

U.S. PATENT DOCUMENTS 5,276,903 A * 1/1994 Shinagawa .................... 712/37
5,684,742 A * 11/1997 Bublitz et al. ......... 365/189.01

* cited by examiner

*Primary Examiner*—Steven S. Paik
*Assistant Examiner*—Jamara A. Franklin
(74) *Attorney, Agent, or Firm*—Pehr Jansson; Anderson & Jansson L.L.P.

(57) ABSTRACT

This invention concerns a system to update encoded data stored in a memory of a data processing device such as a smartcard. In this system, the data is represented by a tree structure in directories and files according to an object representation. According to the invention, the update system comprises a specific referencing object able to reference all or some of the attributes of the encoded data in memory. A microcontroller is then programmed to extract from the referencing object the information required to locate the memory block occupied by this attribute, and update this block, replacing it by the new previously encoded data.

8 Claims, 3 Drawing Sheets

| Type | Instance Number | Attribute to Update | File | Counter (octets) | Length (octets) |
|---|---|---|---|---|---|
| privateRSAKey | 1 | ClassAttributes.ID | EF(PrKDF) | 15 | 20 |
| privateRSAKey | 1 | label | EF(PrKDF) | 110 | 20 |

| Type | Instance Number | Attribute to Update | File | Counter (octets) | Length (octets) |
|---|---|---|---|---|---|
| privateRSAKey | 1 | ClassAttributes.iD | EF(PrKDF) | 15 | 20 |
| privateRSAKey | 1 | label | EF(PrKDF) | 110 | 20 |

UPDATE MANAGEMENT FOR ENCODED DATA IN MEMORY

BACKGROUND OF THE INVENTION

1. Field of the Invention

This invention concerns update management for encoded data stored in memory. The invention applies especially to the management of security data stored in a memory of a token. The example chosen to illustrate the invention is that of the smartcard.

The invention applies especially to portable devices including a WIM (WAP Identity Module) application. This WIM application generally included in a smartcard performs, when requested by a data processing device such as a cellular telephone, operations using public keys such as electronic signatures or data encryption, etc. In this WIM application, the data is stored in memory in compliance with standard PKCS#15 (P K C S: Public-Key Cryptography Standards) defined and published by the RSA incorporation laboratories for the implementation of Public Key Cryptography. As a reminder, note that Public Key Cryptography uses a pair of keys, a public key which can be disclosed to everyone and a private key which must be kept in a safe place and never disclosed. This standard uses an object-oriented data structure, i.e. a hierarchic structure of object classes sorted by category.

Note that the RSA laboratory defines a set of standards PKCS #n (n is the identifier of the standard; RSA uses an integer to identify the various PKCS standards) designed to ensure data interoperability in heterogeneous computer systems. These various standards (PKCS#1, . . . , PKCS#15) define the data types and the algorithms used in public key cryptography. In particular, the standard PKCS#15 concerns the cryptology information stored on tokens capable of storing permanent data.

Refer to the RSA documentation describing these various standards. This document is available at the following web site: http://www.rsasecurity.com.

2. Description of the Related Art

Generally, cryptography uses a private key accessed only by a user and a public key which can be published or distributed upon request for use by those people wanting to communicate with the user. A person wanting to communicate with the user will first obtain a certificate which can be obtained from a certification authority, bearing the user's public key.

Data concerning the keys and certificates is represented by a tree structure in directories and files. Two file types are generally found in this structure:

the DF type files containing file control information (and pointers to EF files or other files), and the EF (elementary files) type files.

In this application, we will not detail the access conditions defined at each level of the card file structure and for function groups acting on the files.

More precisely, format PKCS#15 defines four object classes attached to the root. These classes are:

the Key class,
the certificate class,
the authentication class,
and the data class.

These classes themselves include subclasses. For example, the "Key" class includes three classes called:

private key class
secret key class
public key class

Each object belonging to a class includes attributes. A tree therefore generally includes several objects distributed throughout the tree.

These objects and directories are represented according to the standard ASN.1 (ASN.1 Abstract Syntax Notation) ISO/IEC 8824 published by ANSI (American National Standards Institute). This standard specifies the syntax to be used to describe complex data objects.

These objects are then encoded according to Distinguished Encoding Rules (DER) defined in the same standard ASN.1. These encoding rules define the encoding of objects as byte sequences. There is no need to describe this standard ASN.1 any further since it is not the subject of the invention.

Once encoding has been carried out, an application external to the card, for example a card reader, can read the encoded data stored on the card from a directory PKCS#15 (the root) and find from the tree structure described above how to use the keys, the certificates and applications stored on the card.

Encoding is generally carried out during the card personalisation. After personalisation, some tree attributes may have to be updated. This updating is extremely complicated. Updating from a reader consists, in fact, of two main steps:

Firstly, all encoded data must be decoded,

Secondly, once updating has bee carried out, this data must be encoded again.

These two steps must be repeated whenever at least one attribute of an object has to be updated.

SUMMARY OF THE INVENTION

One purpose of the invention is to simplify the procedure used to update the encoded data on the card.

The card therefore includes in memory a specific referencing object able to reference all or some of the attributes of the encoded data in memory. According to the invention, updating comprises the following steps:

a step to extract from the referencing object the information required to locate the memory block occupied by this attribute, a step to update this block, replacing it by the new data, previously encoded.

Unlike the previous method, it is no longer necessary to decode all the encoded data then re-encode all this data after the update. Now, by using the referencing object, it is possible to update only some of the encoded data. The location information is extracted from the referencing object in order to locate the encoded data which must be updated. The new data is now simply encoded and stored in place of the previous data. The update procedure is considerably simplified.

It will be easier to understand the invention on reading the description below, given as an example and referring to the attached drawings.

DESCRIPTION OF THE INVENTION

To simplify the description, the same elements illustrated in the drawings have the same references.

Figure 1:
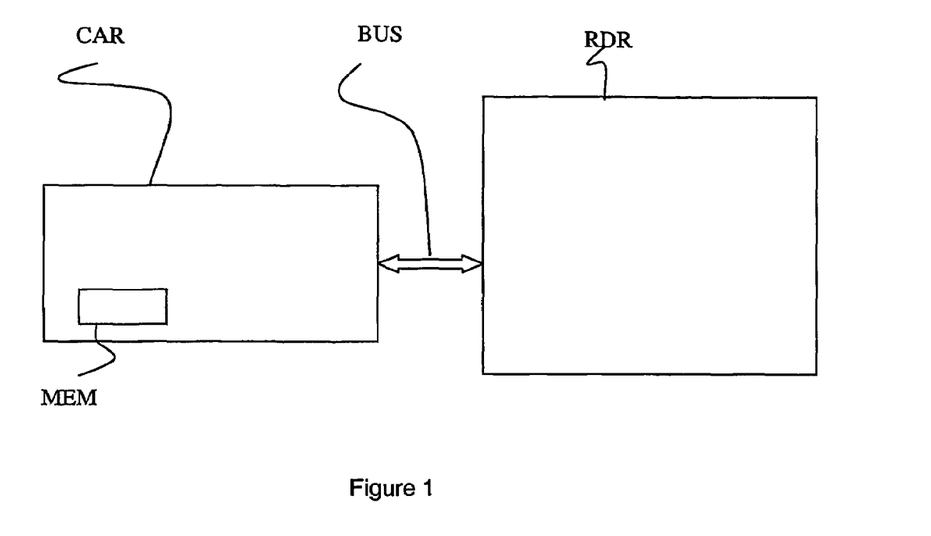
FIG. 1 is a view of a computer system on which the invention can be applied.

FIG. 1 is a simplified view of a computer system on which the invention can be implemented. This system includes a smartcard CAR and a smartcard reader RDR. This reader can be incorporated in a computer such as a cellular telephone, an electronic assistant, etc. Note that a computer is a programmable machine capable of data processing.

In our example of realisation, the smartcard reader is incorporated in a cellular telephone.

Note that a smartcard includes an electronic module (not shown). The module includes a microcontroller and contacts to communicate with the exterior. The microcontroller generally includes:

a microprocessor to execute the commands, non volatile memories ROM (Read Only Memory), whose content is burnt in in the factory and therefore cannot be modified. An encryption algorithm, the operating system, application programming interfaces (API), etc. can therefore be written in the ROM;

non volatile memories, for example EEPROM (electrically erasable programmable read only memory). This memory is generally used to store data specific to each card, for example the cardholder identity, the access rights to the services, the file systems of the card application programs, etc.

volatile memories RAM, work space to execute the card commands, security units, taking into consideration the power supply voltage, clock speed, etc., a data bus connecting everything, an input-output bus BUS to communicate, in our example of realisation, with the reader RDR.

The card stores various items of information in memory. An application WIM stored in this memory performs operations when requested by the cellular telephone. For example, when the cellular telephone requires a signature, it transmits a command to the application WIM, instructing it to produce the signature and return the requested signature to the telephone. Note that the private key which is used to produce the signature is never disclosed.

This application WIM generally uses several private keys stored in the card. When the telephone requests a signature from the application, it must therefore indicate the key to be selected for the cryptography operation. The telephone first reads the tree from the root PKCS#15 up to the nodes associated with the private keys to find the number of private keys available in the application WIM and the identifier of each key.

Figure 2:
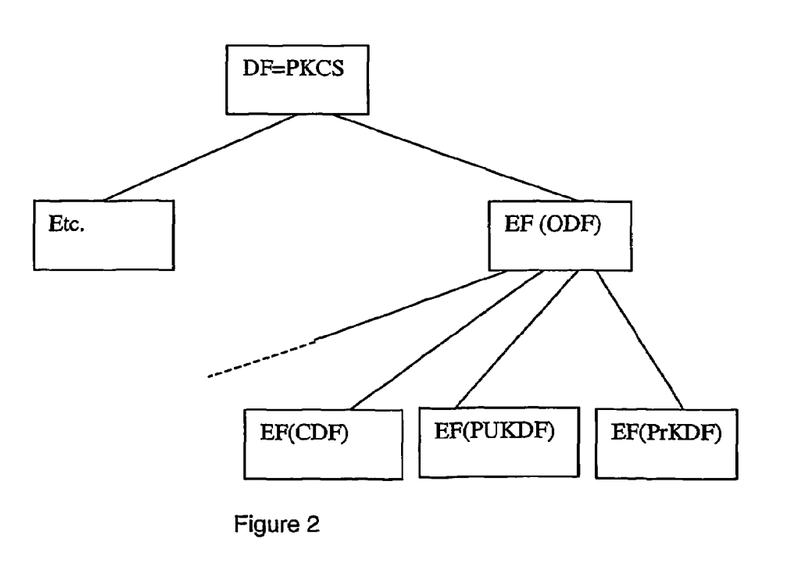
FIG. 2 is a diagrammatic view of an example of the card file tree structure.

This data is stored in memory as a tree structure. FIG. 2 is a diagram illustrating this structure. In our example, this tree includes files of type DF and EF (elementary files) in its nodes. The DF file is called PKCS#15 and represents the tree root. File PKCS#15 has sub-nodes, including a node called EF(ODF) which is an elementary file containing pointers to other elementary files, especially pointers to an elementary file called EF(PrKDF) containing full information concerning the private keys in the application WIM, an elementary file called EF(PuKDF) dedicated to the public keys, an elementary file called EF(CDF) dedicated to the certificates, etc.

Each file EF(PrKDF), EF(PuKDF) and EF(CDF) generally contains an object directory PKCS#15 of a special class. The content of file EF(ODF) complies with ASN.1 syntax.

An object can be written in the elementary file EF(PrKDF), corresponding to a private key, as follows:

```
value PKCS15PrivateKey ::= privateRSAKey :
  {
    commonObjectAttributes
    {
      label "AUT-KEY",
      flags { private },
      authId '01'H
    },
    classAttributes
    {
      iD '6754C890FD57453289AB9076E64245BC6D709FE7'H,
      usage { encrypt, decrypt, sign, verify },
      keyReference 1
    },
    typeAttributes
    {
      value indirect : path :
        {
          path '0012'H
        },
      modulusLength 1024
    }
  }
```

On reading this file, we see that each object includes several attributes. This file includes the following attributes:

The "Label" attribute whose value is AUT-KEY

The "Flag" attribute whose value is {private}. The value {private} indicates that this attribute is protected against unauthorised access. On an integrated circuit card, the accesses (read, write, in use, etc.) to so-called private objects are defined by authentication objects. An access condition could be entry of a PIN code known by the user.

The attribute "AuthId" which includes the value '01'H designating the identifier of the PIN code which protects the use of this key.

The attribute "ClassAttibute.iD" is the key identifier. In our example, it is a binary value which is the value obtained by a cryptographic hashing function such as the SHA-1 function of the public key. For further details on this function, refer to standard FIPS 180-1. The hashing function is not essential in this application.

The attribute "Usage" which has four values {encrypt, decrypt, sign, verify} indicating that this key is only used for encryption, decryption, document signature and signature verification.

Attributes which provide information about the key access path. In our example this key, of length 1024 bytes, is accessed via an access path given by '0012'H.

In our example of realisation, this file is created during the smartcard personalisation phase.

When all files have been written, the data is encoded according to the DER standard. After encoding, the result is stored in memory.

As seen in the introduction, the problem is that once the encoding has been carried out, updating one or more attributes is very costly in terms of computation time and the level of difficulty of the update algorithm.

According to the invention, referencing objects are created, whose attribute values provide information on the referencing in memory of all or some of the object attributes PKCS#15. These referencing objects will then be used by programs running in the device (smartcard in this example) or in the card reader. In our example of realisation, this referencing object is created during the smartcard personalisation phase.

Figure 3:
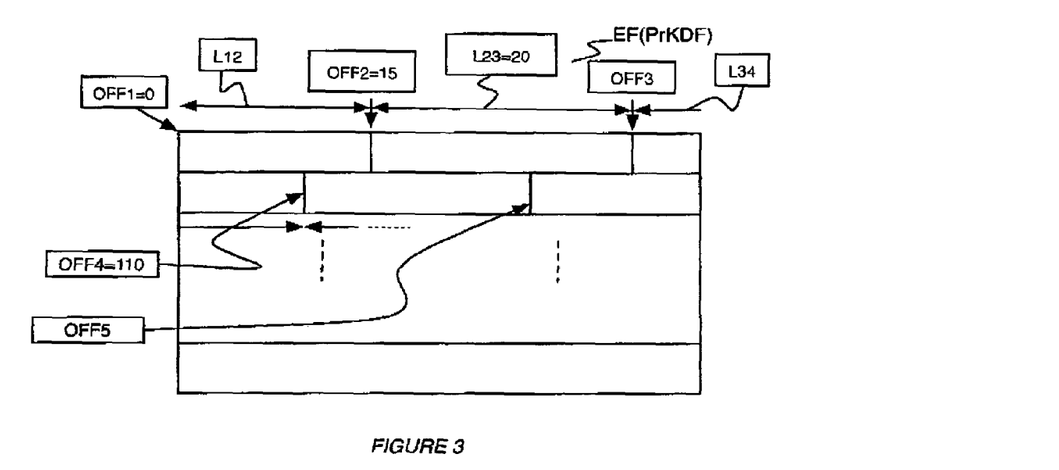
FIG. 3 is a diagrammatic view of the data organisation in memory.

FIG. 3 is a diagrammatic and general view of the data organisation in a file EF(PrKDF) after encoding. Generally, all data items in the memory are concatenated, i.e. stored one after the other. In this file, each attribute has length L, i.e. a number of bytes. The position of each attribute in a file EF can also be determined using a counter OFF which represents in number of bytes the offset between the start of the file EF(PrKDF) and the $1^{st}$ byte of the attribute.

For example, in this file EF(PrKDF), a first attribute ATT1 has a length L12 bytes. This attribute is the first attribute referenced in the file EF(PrKDF); its counter OFF1 is therefore equal to 0. The next attribute ATT2 has a length L23 bytes and its counter OFF2 is equal to L12. Similarly, attribute ATT3 has length L34 bytes and a counter of L12+L23, and so on.

Referencing can be carried out in several ways. In our example of realisation, we have chosen to use the following attributes:

- an object type attribute (e.g. privateRSAKey)
- an attribute designating the instance concerned for this object type,
- an attribute to designate the attribute name,
- a counter OFF attribute used to locate in the file (e.g. EF(PrKDF)) the data block associated with this attribute
- a Length attribute used to indicate the length of the attribute concerned.

Obviously, there are different ways to locate data in a file. For example, instead of the "Counter" and "Length" attributes, the start and end addresses of the data block occupied by this attribute can be used.

Figure 4:
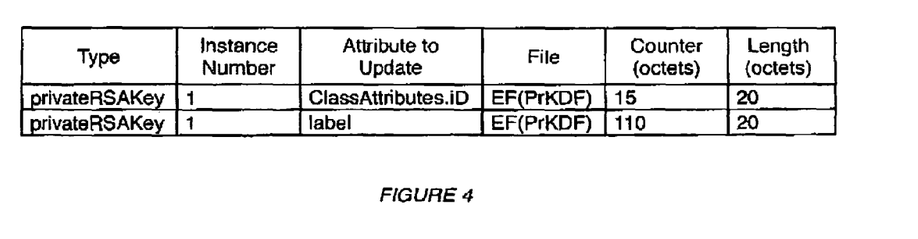
FIG. 4 shows an example of realisation of a referencing object.

FIG. 4 is an example of a referencing object. On this figure, the attributes are represented as a table.

The above five attributes are stored in this table. In our example of realisation, we want to update the attributes Label and ClassAttributes.iD stored in file EF(PrKDF) defined above. We will assume that the object to be modified is the first instance stored with type "privateRSAKey" in file EF(PrKDF).

Obviously, the tree PKCS#15 can store other instances of the same type and other files including objects with attributes. The principle of the invention also applies to all these instances and all these files.

The first row concerns the attribute ClassAttributes.iD. For this attribute,

The first column in the table identifies the object type. In our example, the object type is "privateRSAkey".

The second column indicates that the instance concerned is the first instance of type "privateRSAkey". Obviously, this column is only required if there is more than one instance of this type in the tree.

The third column indicates its name "Label".

The fourth column indicates the file concerned EF(PrKDF) storing the attribute ClassAttributes.iD.

The fifth attribute gives the counter which is 15 bytes in our example.

The sixth attribute gives the attribute length in bytes. In our example, this attribute is set to 20 bytes.

In our example illustrated, for security reasons, this table must be write protected. Preferably, the attributes Counter and Length are set independently from the length of the values of the attributes to be updated. In other words, for each attribute referenced in the table, a specific length is set which cannot be modified. This specific length includes enough bytes to store attributes of varying length.

Figure 5:
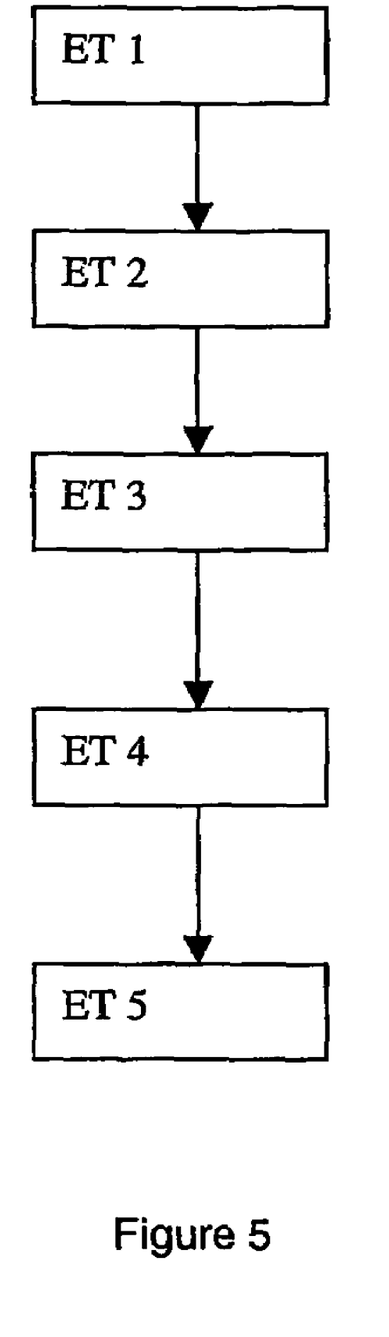
FIG. 5 is an algorithm illustrating the various steps of an example of realisation.

FIG. 5 is an algorithm illustrating the main steps of the method applied to our example of realisation. Assume that the updating concerns the attribute "Label" in file EF(PrKDF) of type privateRSAKey and that the new value of this attribute is "AUT-KEY2".

The steps are as follows:

Step 1:

A first step ET1 consists of obtaining the new value to be updated in file EF(PrKDF).

Step 2:

A second step ET2 consists of transmitting the new value of the attribute "Label" to the card for updating, using a command included in the cellular telephone. In order to identify the attribute in the table, since it could be in several files in the tree at the same time, the command also includes, in our example, the attributes ClassAttributes.iD and the instance concerned "privateRSAkey". A computer program stored in the cellular telephone transmits an update command to the card.

Step 3

During a third step ET3, the card receives and processes the command. A computer program stored in the card is activated upon reception of the update command sent from the cellular telephone. This program then points to the referencing object to locate the attribute "Label" in memory.

Step 4

During a fourth step ET4, the referencing object supplies the counter with 110 and the length with 20.

Step 5

A fifth step ET5 consists of encoding this new value "AUT-KEY2" and writing it at the position indicated.

Another example could be the generation of a new public key pair in the smartcard. In our example, the hash of the public key is used as the key identifier in the objects PKCS#15. After generating the key pair, the corresponding objects PKCS#15 must be updated by the new hashed value of the public key. Since the hashed value of the public key has a fixed length, the application stored in the card which generates the new public key pair only needs to find all instances of the hashed public key to be replaced amongst the objects PKCS#15; the application uses the specific referencing object to find these instances. Once the instances have been found, they are updated by the new values. In this case, the procedure is the same with an additional step ET4bis. The encoding of step 4 is therefore preceded by a hashing step on the value of the attribute "ClassAttribute.iD".

A synonym for "public key pair" is "asymmetric key pair".

Generally, the invention concerns a data processing device, in particular a smartcard, storing in memory encoded data represented by a tree structure in directories and files according to an object representation, characterised in that it comprises a specific referencing object able to reference all or some of the attributes of the encoded data in memory, and in that the update of the encoded data is managed by a microcontroller programmed to extract from the referencing object the information required to locate the memory block occupied by this attribute, and update this block, replacing it by the new data, previously encoded.

This referencing object is stored in memory in the data processing device. We have seen in our example of realisation that this referencing object is write protected for obvious security reasons. Write protection ensures that the referencing data stored in this memory will not be modified.

The microcontroller programmed for the update may either be located on the data processing device or on an external tool connected to the data processing device.

In our example of realisation, said referencing object comprises permanent data, i.e. the data remains unchanged even in case of power failure. In our example, even when the card is withdrawn from its reader, i.e. when it is no longer powered up, this object is stored in memory and cannot be changed.

Also, we have seen that said referencing object includes attributes. In our example of realisation, five attributes were defined. We can see that three attributes are sufficient to identify the file, for example file EF(PrKDF), the attribute, for example attribute ClassAttributes.iD to be updated in this file, and the location, for example by the pair of values (counter, Length), of this attribute in the file in question.

We obtain a method to update encoded data stored in a memory of a data processing device such as a smartcard, characterised in that it comprises:

a preliminary step to create a specific referencing object able to reference all or some of the attributes of the encoded data in memory, and in that updating comprises the following steps:

a step to extract from the referencing object the information required to locate the memory block occupied by this attribute, a step to update this block, replacing it by the new data, previously encoded.

Preferably, this specific referencing object is created during the smartcard personalisation phase.

The invention also concerns a computer program to update encoded data stored in a memory of a data processing device such as a smartcard, said program comprising program code instructions to execute update steps as previously defined, said program being executed using a microcontroller of the update system as previously defined. We have also seen that this program carries out updating which can either be carried out by a microcontroller located on the card or on an external tool connected to the card. This external tool could be, for example, a mobile telephone reader to which the smartcard is connected.

The invention offers significant savings in terms of computation time, storage size as well as considerably simplifying the update algorithm.

Although specific embodiments of the invention have been described and illustrated, the invention is not to be limited to the specific forms or arrangements of parts so described and illustrated. The invention is limited only by the claims.

APPENDIX

I) writing file EF(PrKDF) according to standard PKCS#15 and ASN1

```
value PKCS15PrivateKey ::= privateRSAKey :
{
    commonObjectAttributes
    {
        label "AUT-KEY",
        flags { private },
        authId '01'H
    },
    classAttributes
    {
        iD '001111111111111111111111111111111111111100'H,
        usage { encrypt, decrypt, sign, verify },
        keyReference 1
    },
    typeAttributes
    {
        value indirect : path :
        {
            path '0012'H
        },
        modulusLength 1024
    }
}
value PKCS15PrivateKey ::= privateRSAKey :
{
    commonObjectAttributes
    {
        label "NR-KEY",
        flags { private },
        authId '02'H
    },
    classAttributes
    {
        iD '002222222222222222222222222222222222222200'H,
        usage { nonRepudiation },
        keyReference 2
    },
    typeAttributes
    {
        value indirect : path :
        {
            path '0012'H
        },
        modulusLength 1024
    }
}
```
After encoding this file, we obtain:
Record length (hexa): 41
303F3010 0C074155 542D4B45 59030207 80040101 301D0414
00111111 11111111 11111111 11111111 11111100 030201E2
020101A1 0C300A30 04040200 12020204 00
Record length (hexa): 41
303F300F 0C064E52 2D4B4559 03020780 04010230 1E041400
22222222 22222222 22222222 22222222 22220003 03060040
020102A1 0C300A30 04040200 12020204 00
EF(PrKDF) file length: 82

II) Writing file EF(UnusedSpace) according to standard PKCS#15 and ASN1

```
value PKCS15UnusedSpace ::=
{
    path
    {
        path '6200'H,
        index 0,
        length 1500
    },
    authId '01'H
}
```

-continued

II) Writing file EF(UnusedSpace) according to standard PKCS#15 and ASN1

After encoding this file, we obtain:
Record length (hexa): 12
3010300B 04026200 02010080 0205DC04 0101
EF(UnusedSpace) file length: 12

III) Writing file EF(DODF) according to standard PKCS#15 and ASN1

```
value PKCS15Data ::= opaqueDO :
  {
    commonObjectAttributes
    {
      flags { private, modifiable },
      authId '01'H
    },
    classAttributes
    {
      applicationOID { 2 23 43 1 2 1 }
    },
    typeAttributes indirect : path :
      {
        path '5108'H,
        index 0,
        length 176
      }
  }
value PKCS15Data ::= opaqueDO :
  {
    commonObjectAttributes
    {
      flags { private, modifiable },
      authId '01'H
    },
    classAttributes
    {
      applicationOID { 2 23 43 1 2 2 }
    },
    typeAttributes indirect : path :
      {
        path '5109'H,
        index 0,
        length 176
      }
  }
```
After encoding this file, we obtain:
Record length (hexa): 23
30213007 030206C0 04010130 07060567 2B010201 A10D300B
04025108 02010080 0200B0
Record length (hexa): 23
30213007 030206C0 04010130 07060567 2B010202 A10D300B
04025109 02010080 0200B0
EF(DODF) file length: 46

IV) Writing file EF(CDF) according to standard PKCS#15 and ASN1

```
value PKCS15Certificate ::= x509Certificate :
  {
    commonObjectAttributes
    {
      label "User Auth Certificate File",
      flags { modifiable }
    },
    classAttributes
    {
```

-continued

IV) Writing file EF(CDF) according to standard PKCS#15 and ASN1

```
      iD '0011111111111111111111111111111111111100'H,
      authority FALSE,
      requestId
      {
        idType 5,
        idValue PKCS15Identifier :
          '492C1FF42D87C376789444E8EC309C67C97B8D25'H
      }
    },
    typeAttributes
    {
      value indirect : path :
        {
          path '6001'H,
          index 0,
          length 704
        }
    }
  }
value PKCS15Certificate ::= x509Certificate :
  {
    commonObjectAttributes
    {
      label "User NR Certificate File",
      flags { modifiable }
    },
    classAttributes
    {
      iD '0022222222222222222222222222222222222200'H,
      authority FALSE,
      requestId
      {
        idType 5,
        idValue PKCS15Identifier :
          '492C1FF42D87C376789444E8EC309C67C97B8D25'H
      }
    },
    typeAttributes
    {
      value indirect : path :
        {
          path '6002'H,
          index 0,
          length 704
        }
    }
  }
value PKCS15Certificate ::= x509Certificate :
  {
    commonObjectAttributes
    {
      label "User Auth Certificate URL",
      flags { modifiable }
    },
    classAttributes
    {
      iD '0011111111111111111111111111111111111100'H,
      authority FALSE,
      requestId
      {
        idType 5,
        idValue PKCS15Identifier :
          '492C1FF42D87C376789444E8EC309C67C97B8D25'H
      }
    },
    typeAttributes
    {
      value indirect : url : "http://baseAddress/certs?ih=Oi+06/g ..."
    }
  }
value PKCS15Certificate ::= x509Certificate :
  {
    commonObjectAttributes
    {
      label "User NR Certificate URL",
      flags { modifiable }
    },
```

-continued

IV) Writing file EF(CDF) according to standard PKCS#15 and ASN1

```
    classAttributes
    {
        iD '002222222222222222222222222222222222222200'H,
        authority FALSE,
        requestId
        {
            idType 5,
            idValue PKCS15Identifier :
                '492C1FF42D87C376789444E8EC309C67C97B8D25'H
        }
    },
    typeAttributes
    {
        value indirect : url : "http://baseAddress/certs?ih=Oi+06/g ..."
    }
}
```

After encoding this file, we obtain:

Record length (hexa): 68
30663020 0C1A5573 65722041 75746820 43657274
69666963 61746520 46696C65 03020640 30310414
00111111 11111111 11111111 11111111 11111100
30190201 05041449 2C1FF42D 87C37678 9444E8EC
309C67C9 7B8D25A1 0F300D30 0B040260 01020100
800202C0

Record length (hexa): 66
3064301E 0C185573 6572204E 52204365 72746966
69636174 65204669 6C650302 06403031 04140022
22222222 22222222 22222222 22222222 22003019
02010504 14492C1F F42D87C3 76789444 E8EC309C
67C97B8D 25A10F30 0D300B04 02600202 01008002
02C0

Record length (hexa): A0
30819D30 1F0C1955 73657220 41757468 20436572
74696669 63617465 2055524C 03020640 30310414
00111111 11111111 11111111 11111111 11111100
30190201 05041449 2C1FF42D 87C37678 9444E8EC
309C67C9 7B8D25A1 47304516 43687474 703A2F2F
62617365 41646472 6573732F 63657274 733F6968
3D4F692B 30362F67 3975574E 66777977 42344343
6D343147 79523845 3D736E3D 4F6F7230 36673D3D Record length (hexa): 9E
30819B30 1D0C1755 73657220 4E522043 65727469
66696361 74652055 524C0302 06403031 04140022
22222222 22222222 22222222 22222222 22003019
02010504 14492C1F F42D87C3 76789444
E8EC309C67C97B8D 25A14730 45164368 7474703A
2F2F6261 73654164 64726573 732F6365 7274733F
69683D4F 692B3036 2F673975 574E6677 79774234
43436D34 31477952 38453D73 6E3D4F6F 72303741
3D3D EF(CDF) file length: 20C V) Writing file EF(ODF) according to standard PKCS#15 and ASN1

```
    value PKCS15Objects ::= privateKeys : path :
    {
        path '5101'H
    }
```

V) Writing file EF(ODF) according to standard PKCS#15 and ASN1

```
    value PKCS15Objects ::= certificates : path :
    {
        path '5103'H
    }
    value PKCS15Objects ::= trustedCertificates : path :
    {
        path '5104'H
    }
    value PKCS15Objects ::= usefulCertificates : path :
    {
        path '5105'H
    }
    value PKCS15Objects ::= dataObjects : path :
    {
        path '5106'H
    }
    value PKCS15Objects ::= authObjects : path :
    {
        path '5107'H
    }
```

Record length (hexa): 8
A0063004 04025101
Record length (hexa): 8
A4063004 04025103
Record length (hexa): 8
A5063004 04025104
Record length (hexa): 8
A6063004 04025105
Record length (hexa): 8
A7063004 04025106
Record length (hexa): 8
A8063004 04025107
EF(ODF) file length: 30

VI) Writing file EF(CDF) according to standard PKCS#15 and ASN1

```
value PKCS15Certificate ::= wtlsCertificate :
{
    commonObjectAttributes
    {
        label "Entrust.net Test WAP CA",
        flags { }
    },
    classAttributes
    {
        iD 'D4C6D9234AEF75233FB5B5BF4427FCFBC55C40E3'H,
        authority TRUE,
        requestId
        {
            idType 5,
            idValue PKCS15Identifier :
                'D4C6D9234AEF75233FB5B5BF4427FCFBC55C40E3'H
        }
    },
    typeAttributes
    {
        value indirect : path :
        {
            path '6101'H,
            index 0,
            length 431
        }
    }
}
```

After encoding this file, we obtain:

Record length (hexa): 67
A365301C 0C17456E 74727573 742E6E65 74205465
73742057 41502043 41030100 30340414 D4C6D923
4AEF7523 3FB5B5BF 4427FCFB C55C40E3 0101FF30

19020105 0414D4C6 D9234AEF 75233FB5 B5BF4427 FCFBC55C 40E3A10F 300D300B 04026101 02010080 0201AF

EF(CDF) file length: 67

---

VII) Writing file EF(AODF) according to standard PKCS#15 and ASN1

```
value PKCS15Authentication ::= pin :
{
  commonObjectAttributes
  {
    label "PIN-G",
    flags { private, modifiable }
  },
  classAttributes
  {
    authId '01'H
  },
  typeAttributes
  {
    pinFlags { case-sensitive, local, initialized,
      needs-padding, disable-allowed },
    pinType ascii-numeric,
    minLength 4,
    storedLength 8,
    pinReference 1,
    padChar 'FF'H,
    path
    {
      path '0000'H
    }
  }
}
value PKCS15Authentication ::= pin :
{
  commonObjectAttributes
  {
    label "PIN-NR",
    flags { private, modifiable }
  },
  classAttributes
  {
    authId '02'H
  },
  typeAttributes
  {
    pinFlags { case-sensitive, local, initialized, needs-padding },
    pinType ascii-numeric,
    minLength 4,
    storedLength 8,
    pinReference 2,
    padChar 'FF'H,
    path
    {
      path '0100'H
    }
  }
}
```

---

After encoding this file, we obtain:

Record length (hexa): 32
3030300B 0C055049 4E2D4703 0206C030 03040101 A11C301A 030307CC 800A0101 02010402 01088001 010401FF 30040402 0000

Record length (hexa): 32
3030300C 0C065049 4E2D4E52 030206C0 30030401 02A11B30 19030202 CC0A0101 02010402 01088001 020401FF 30040402 0100

EF(AODF) file length: 64

The invention claimed is:

1. A data processing device, storing encoded data in memory represented by a tree structure in directories and files according to an object representation, comprising:

a specific referencing object to reference all or some of the attributes of the encoded data in memory, and an update of the encoded data managed by a program run on the data processing device so as to, in response to a new public key pair generation by the data processing device:

extract from said specific referencing object information required to locate a memory block occupied by a hashed value of a former public key, and update the block, replacing the block by a newly generated hashed value of the newly generated public key, in a previously encoded state.

2. The device according to claim 1, wherein the access to said referencing object is write-protected in the data processing device.

3. The device according to claim 1 or 2, wherein said referencing object comprises permanent data.

4. The device according to claim 1, wherein the referencing object comprises attributes identifying:

a file (EF(PrKDF)), an attribute (ClassAttributes.iD) to be updated in the file, and a location (counter, Length) of the attribute in the file.

5. A method to update an encoded hashed value of a public key in a memory of a data processing device while a new public key pair has been newly generated by the data processing device, said hashed value being part of data being represented by a tree structure in directories and files according to an object representation, comprising:

a preliminary step to create a specific referencing object able to reference all or some of the attributes of the encoded data in memory, and in that updating comprises the following steps performed by the data processing device:

a step to extract from the referencing object the information required to locate a memory black occupied by a hashed value of a former public key, a step to update the block, replacing the block by the hashed value of the newly generated public key, previously encoded.

6. The update method according to claim 5, wherein, after creating the referencing object and before updating the encoded data, a step consists of write protecting said referencing object in the data processing device.

7. The method according to claim 5, wherein the preliminary step to create a specific referencing object is carried out during the personalisation phase of a data processing device.

8. A storage media comprising:

a computer program to update encoded data stored in a memory of a data processing device, said program having program code instructions to execute update steps including:

a preliminary step to create a specific referencing object to reference all or some of the attributes of the encoded data in memory, and in that updating including the following steps:

a step to extract from the referencing object the information required to locate a memory block occupied by the attribute, a step to update the block, replacing the block by the new data, previously encoded.

* * * * *